March 7, 1967 E. R. McCARTER 3,308,392

SEISMIC AMPLIFIER HAVING MEANS FOR CHANGING THE AMPLIFICATION OF THE SEISMIC SIGNAL BY DISCRETE STEPS PROPORTIONAL TO A GIVEN POWER OF TWO

Filed Feb. 4, 1965 5 Sheets-Sheet 1

Ed R. McCarter
INVENTOR.

BY John D. Gassett
ATTORNEY

SEISMIC AMPLIFIER HAVING MEANS FOR CHANGING THE AMPLIFICATION OF THE SEISMIC SIGNAL BY DISCRETE STEPS PROPORTIONAL TO A GIVEN POWER OF TWO

Filed Feb. 4, 1965 5 Sheets-Sheet 2

| PULSE FROM CONTROL 92 | LOSSER 18 16 X | LOSSER 36 16 X | LOSSER 64 16 X | LOSSER 50 4 X | LOSSER 78 2 X | GAIN |
|---|---|---|---|---|---|---|
| 0 | 1 | 1 | 1 | 1 | 1 | 1 |
| 1 | 1 | 1 | 1 | 1 | 0 | 2 |
| 2 | 1 | 1 | 1 | 0 | 1 | 4 |
| 3 | 1 | 1 | 1 | 0 | 0 | 8 |
| 4 | 0 | 1 | 1 | 1 | 1 | 16 |
| 5 | 0 | 1 | 1 | 1 | 0 | 32 |
| 6 | 0 | 1 | 1 | 0 | 1 | 64 |
| 7 | 0 | 1 | 1 | 0 | 0 | 128 |
| 8 | 0 | 0 | 1 | 1 | 1 | 256 |
| 9 | 0 | 0 | 1 | 1 | 0 | 512 |
| 10 | 0 | 0 | 1 | 0 | 1 | 1024 |
| 11 | 0 | 0 | 1 | 0 | 0 | 2048 |
| 12 | 0 | 0 | 0 | 1 | 1 | 4096 |
| 13 | 0 | 0 | 0 | 1 | 0 | 8192 |
| 14 | 0 | 0 | 0 | 0 | 1 | 16,384 |
| 15 | 0 | 0 | 0 | 0 | 0 | 32,768 |

1 - INDICATES LOSSER CIRCUIT OPERATIVE
0 - INDICATES LOSSER CIRCUIT BYPASSED

Ed R. McCarter
INVENTOR.
BY John D. Gassett
ATTORNEY

March 7, 1967 E. R. McCARTER 3,308,392

SEISMIC AMPLIFIER HAVING MEANS FOR CHANGING THE AMPLIFICATION OF THE SEISMIC SIGNAL BY DISCRETE STEPS PROPORTIONAL TO A GIVEN POWER OF TWO

Filed Feb. 4, 1965 5 Sheets-Sheet 3

Ed R. McCarter
INVENTOR.

BY John D. Gassett
ATTORNEY

March 7, 1967 E. R. McCARTER 3,308,392

SEISMIC AMPLIFIER HAVING MEANS FOR CHANGING THE AMPLIFICATION OF THE SEISMIC SIGNAL BY DISCRETE STEPS PROPORTIONAL TO A GIVEN POWER OF TWO

Filed Feb. 4, 1965 5 Sheets-Sheet 4

Ed R. McCarter

INVENTOR.

BY John D. Gassett

ATTORNEY

Ed R. McCarter
INVENTOR.
BY John D. Gassett
ATTORNEY

United States Patent Office 3,308,392
Patented Mar. 7, 1967

3,308,392

SEISMIC AMPLIFIER HAVING MEANS FOR CHANGING THE AMPLIFICATION OF THE SEISMIC SIGNAL BY DISCRETE STEPS PROPORTIONAL TO A GIVEN POWER OF TWO

Ed R. McCarter, Stillwater, Okla., assignor, by mesne assignments, to Esso Production Company, Houston, Tex., a corporation of Delaware
Filed Feb. 4, 1965, Ser. No. 432,072
12 Claims. (Cl. 330—144)

This is a continuation-in-part of pending application, Serial No. 297,828, filed July 26, 1963, and now abandoned.

This invention relates generally to an amplifier system for use in the recording of seismic signals. It relates especially to an amplifier wherein the net amplification is a function of its output.

In a general method of seismic exploration, a seismic disturbance such as an explosion of dynamite is generated at or near the surface of the earth. Seismic waves are thus transmitted through the earth and are detected at various locations by seismic transducers, commonly called geophones. This signal detected is relatively strong at first and then weakens with time. To compensate for this, many systems employ an AVC (automatic volume control) system whereby the decaying effect is compensated. This most usually takes the form of an amplifier connected to the geophone and an attenuator connected internally to the amplifier which at first attenuates a signal considerably and then gradually diminishes the attenuation with time. The signal is then modulated a number of ways, such as with pulse width modulation and then is recorded on magnetic tape or the like or it may be recorded directly as a wiggly trace record. These signals, thus recorded, are quite useful in the exploration for oil and gas.

One object of this invention is to provide an amplifier system in which the total amplification of the system is the function of the strength of the seismic signal.

Another object of this invention is to provide an amplifying system wherein the detected seismic signal is amplified by a factor of a schedule of the powers of 2 dependent upon the energy of the seismic signal.

Briefly, in a preferred embodiment, this invention includes a plurality of cascaded amplifiers. Connected between each successive pair of amplifiers is a losser circuit. The losser circuit attenuates a signal fed thereto by a fixed factor. Each losser circuit means includes a shunt and switching arrangement so that the losser circuit in effect can be bypassed. Control, responsive to the strength of the output seismic signal, is provided to selectively switch losser circuits in or out. The attenuation of the losser circuits and the amplification of the amplifiers are so selected and controlled such that the change of amplification of the seismic signal is by fixed amounts in which the amplification is a factor which is $2^n$ where $n$ is zero or some whole number power. Such amplification gains, then, are readily compatible with binary recording and computations.

Other objects and a better understanding of this invention can be had from the following description taken in conjunction with the drawing in which.

Figure 1:
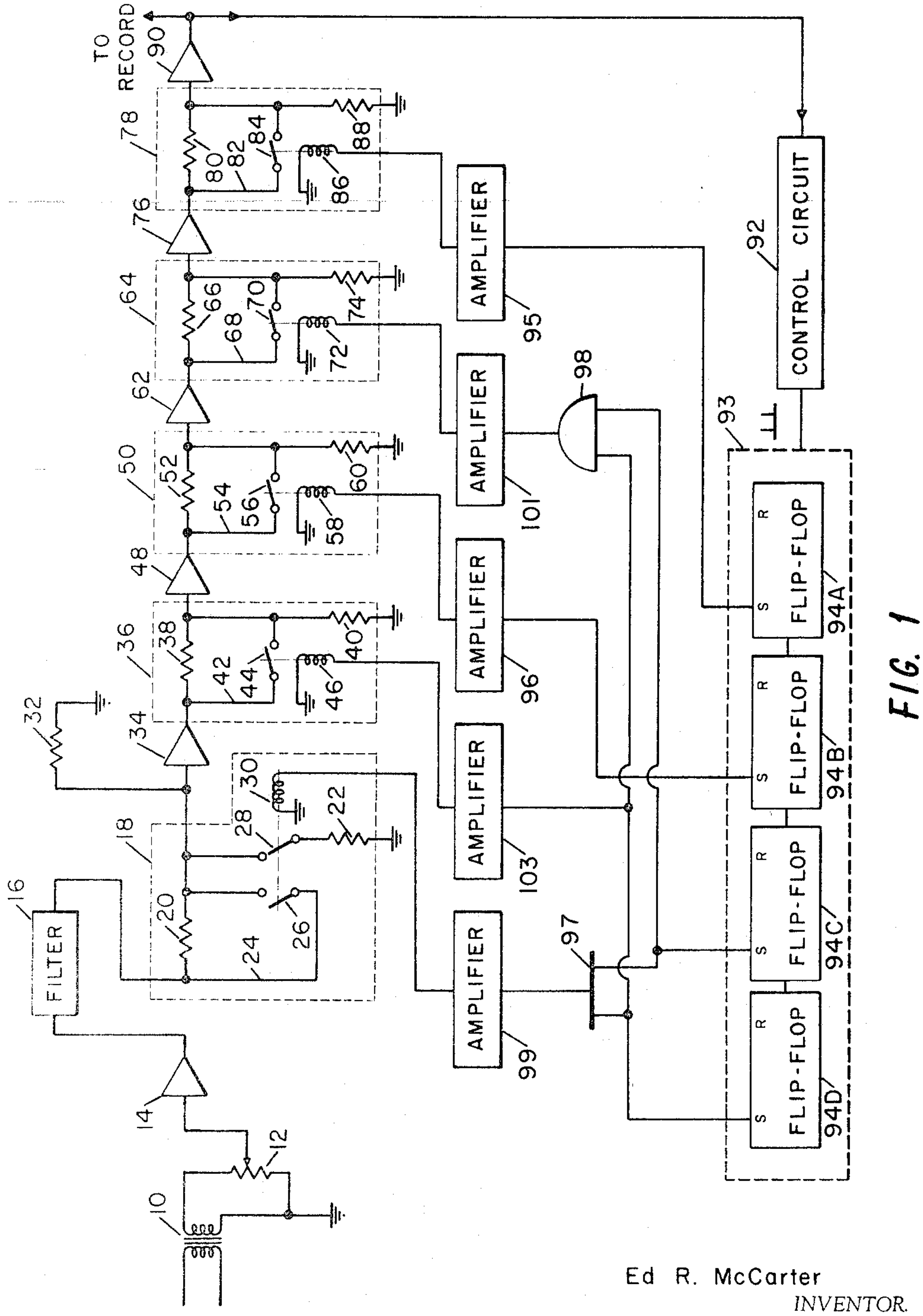
FIG. 1 illustrates in block diagram form a preferred embodiment of the amplification system of the invention.

Attention is first directed toward FIG. 1 wherein a seismic signal is fed through input transformer 10 from a geophone not shown. A variable resistor 12 is connected to the secondary side of transformer 10 in a conventional manner. Variable resistor 12 is really a gain control means. A signal from transformer 10 through resistor 12 is fed to an amplifier 14 and to a filter 16 all in a conventional manner.

The output of filter 16 is electrically connected to a first losser circuit 18. Losser circuit 18 includes a series resistor 20 and a shunt resistor 22. Resistor 20 is provided with a shunt circuit 24 having a switch 26. Shunt resistor 22 has a switch 28 in its shunt circuit. Switch 28 is in series with resistor 22. Switches 26 and 28 are ganged and are operated by relay 30. Switches 26 and 28 are selected and arranged such that when one is open, the other is closed. The energization of relay coil 30 will be described in detail hereinafter.

It is desired to keep the output impedance on filter 16 the same whether switches 26 and 28 are opened or closed. This is accomplished with the resistive network of losser element 18 and a resistor 32 which grounds the output of losser circuit 18. In a typical circuit to maintain a constant output impedance for filter 16, resistor 20 can be 9.375K ohms, resistor 22—666.7 ohms, and resistor 32—10K ohms.

The output of losser circuit 18 is connected to an amplifier 34 which has a preselected amplification factor. The output of amplifier 34 is connected to a second losser circuit 36 which includes a resistor 38 and shunt resistor 40. Resistor 38 is provided with a shunt 42 having switch 44 which is operated by relay coil 46. The resistance of resistors 38 and 40 are picked to provide the correct or desired attenuation of the signal. For example, to obtain an attenuation of 16 when switch 44 is open and no attenuation when it is closed. Resistor 38 can be 150K ohms and resistor 40 can be 10K ohms.

The output from losser circuit 36 is fed to amplifier 48. The output of amplifier 48 is electrically connected to a third losser circuit 50 which is similar to losser circuit 36 and includes resistor 52, shunt 54 having switch 56 operated by relay 58, and grounded shunt resistor 60. The output of losser element 50 is connected to an amplifier 62. The output of amplifier 62 is connected to a fourth losser circuit 64. Losser circuit 64 is similar to losser circuit 50 and includes series resistor 66 having a shunt 68 with a switch 70 therein operated by relay 72. Also provided is a shunt resistor 74.

The output of losser circuit 64 is connected to amplifier 76. The output of amplifier 76 is connected to a fifth losser circuit 78 which is similar to losser circuit 64. Losser circuit 78 has a series resistor 80 having a shunt 82 with switch 84 operated by relay coil 86. It also includes shunt resistor 88.

The output of losser circuit 78 goes to amplifier 90. The output of amplifier 90 is then recorded or otherwise used as the seismic signal. The output signal from amplifier 90 is also connected to control circuit 92 which drives binary counter 93. As will be explained, binary counter 93 is used to control the operations of relays 30, 46, 58, 72 or 86. The control of these relays determines the total amplification of the seismic signal. A suitable control circuit 92 is described hereinafter in FIG. 4. Generally speaking, however, control circuit 92 is of a character to have an output pulse when the average energy level of the signal from amplifier 90 declines to a certain selected value. Binary counter 93 has four flip-flops 94A, 94B, 94C, and 94D. These flip-flops are connected in series. A suitable binary counter is commercially available from Packard Bell Computer and is designated as "BC1 Binary Counter." The "set" of flip-flop 94A is fed to amplifier 95 whose output operates or energizes relay 86 of the fifth losser circuit 78. The "set" of flip-flop 94B is connected to amplifier 96 which operates relay 58 of the third losser circuit 50.

The "set" of flip-flop 94C is fed to one input of "or" gate 97, and to one of the two inputs or "input legs" of "and" gate 98. The "set" of flip-flop 94D is fed to "or" gate 97, to one of the two inputs of "and" gate 98 and to amplifier 103. The output of "or" gate 97 is fed to amplifier 99 which is connected to relay 30 of the first losser circuit 18. The output of "and" gate 98 is connected to amplifier 101 which is connected to relay 72 of the fourth losser circuit 64.

Attention will now be directed toward the operation of the device of FIG. 1 so that amplification of the seismic signal by factors of schedules of powers of two is obtained. To obtain this, in one embodiment amplifiers 14, 34, 48, 62, 76 and 90 each have an amplification factor of 8. In this particular embodiment losser elements 18, 36, 50, 64, and 78 are designed to have attenuation factors of 16, 16, 4, 16, and 2 respectively. Losser element 18 has an attenuation factor of 16 to 1 when switch 26 is open. This is conveniently accomplished in a typical circuit by giving resistor 20, for example, a resistance of 9.37K ohms, resistance 22 having to have 666.7 ohms and resistance 32 to have 10K ohms. Losser element 36 likewise has an attenuation factor of 16 to 1. This is conveniently accomplished in a typical unit as giving resistor 38 a resistance of 150K and resistance 40 10K resistance. Losser element 50 has an attenuation factor of 4 to 1 which in a typical circuit is accomplished by giving resistor 52 a 30K ohm and selecting resistor 60 to be 10K ohms. Losser circuit 64 has an attenuation factor of 16 to 1 which in a typical circuit is accomplished by selecting resistor 66 to have 150K ohms, and resistor 74 to have 10K ohms. Losser element 78 is selected to have an attenuation factor of 2 to 1 which is conveniently accomplished in a typical circuit by selecting resistor 80 to have 10K ohms and resistor 88 to also have 10K ohms. The attenuation of the signal through each losser circuit is given by $$\frac{R_2}{R_1+R_2}$$

where $R_1$ is series resistance, such as of resistor 38, and $R_2$ is resistance of shunt resistor, such as resistor 40.

If none of the relays in the losser circuits are energized, then the attenuation of the losser circuits equals the total amplification of amplifiers 34, 48, 62, 76, and 90. When the first pulse is received from control circuit 92, the "set" of flip-flop 94A of binary counter 93 has an output which is amplified in amplifier 95 and energizes coil 86 and maintains it energized as long as the set has an output. This removes the attenuation of losser circuit 78 and the amplification is increased by 2. When the second pulse from control circuit 92 is received by binary counter 93, flip-flop 94B has an output on its set or "*s*" output and flip-flop 94A has no output on its set. Then the coil of relay 86 is no longer energized and switch 84 of losser circuit 78 is opened and losser circuit 78 regains its attenuation factor of 2. At the same time the set output from flip-flop 94B is amplified by amplifier 96 and energizes coil 58 which closes switch 56, thus short-circuiting losser element 50. This removes the attenuation factor of 4 of losser element 50. Thus the total gain for the cascade of amplifiers is 4, i.e. from the output of filter 16 to the output of amplifier 90. Each pulse from control circuit 92 is counted by counter 93. Each pulse affects the determination or control of the operation of the relay coils of the losser circuits. This can be expressed in Boolean algebra as follows:

$$A'=F_1$$
$$B'=(F_3)(F_4)$$
$$C'=F_2$$
$$D'=F_4$$
$$E'=F_3+F_4$$

in which $F_1$, $F_2$, $F_3$, and $F_4$ indicate the true condition of the "set" output of flip-flops 94A, 94B, 94C, and 94D respectively. A′, B′, C′, D′, and E′ represent the occurrence of the energization of the relay coils 86, 72, 58, 46, and 30 respectively of losser circuits 78, 64, 50, 36, and 18.

Figures 2, 3:
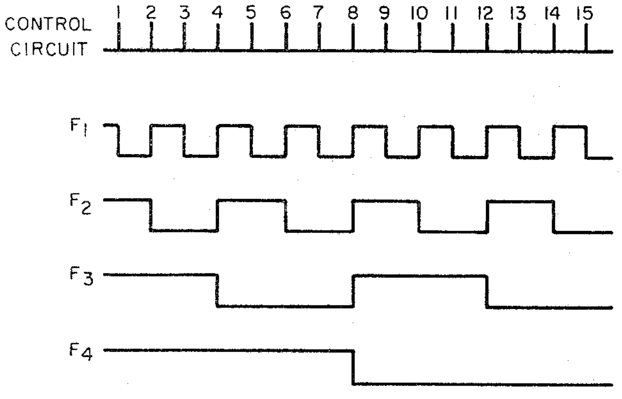
FIG. 2 illustrates total gain for various combinations of bypassing of selected attenuation factors of losser circuits shown in FIG. 1.
FIG. 3 illustrates the occurrence of true outputs of the flip-flops of FIG. 1.

FIG. 3 illustrates the relationship of the occurrence of pulses from control circuit 92 and the various flip-flops having true outputs. For example, flip-flop 94A ($F_1$) has a true "set" output between every other pair of pulses and flip-flop 94B ($F_2$) has a true output between the second and fourth pulses, sixth and eighth, tenth and twelfth, etc. from control circuit 92. Flip-flop 94C ($F_3$) has a true output between the fourth and eighth pulses etc., and flip-flop 94D ($F_4$) has a true output from the eighth pulse to sixteenth pulse etc. On the fifteenth pulse from control circuit 92 all the relays are closed, thus removing the attenuation of the losser circuits 18, 36, 50, 64 and 78. FIG. 2 shows the gain of the overall amplifier (from filter 16 to output of filter 90) for each pulse from zero to 15 from control circuit 92. It is indicated therein for each pulse which losser circuits are operative and which are inoperative. It is thus seen that the system in FIG. 1, using the factors given above, has an overall amplification or gain which is a schedule of powers of two from two to the zero power to two to the fifteenth power.

Figure 4:
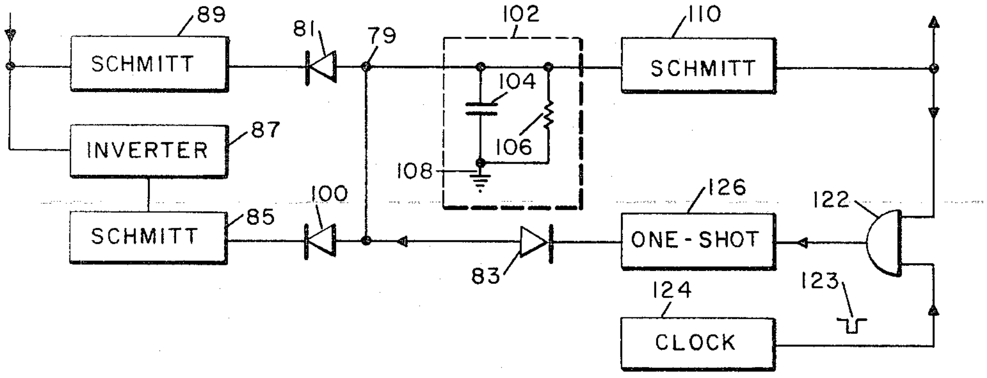
FIG. 4 illustrates a suitable control circuit for use in the apparatus of FIG. 1.
Figure 5:
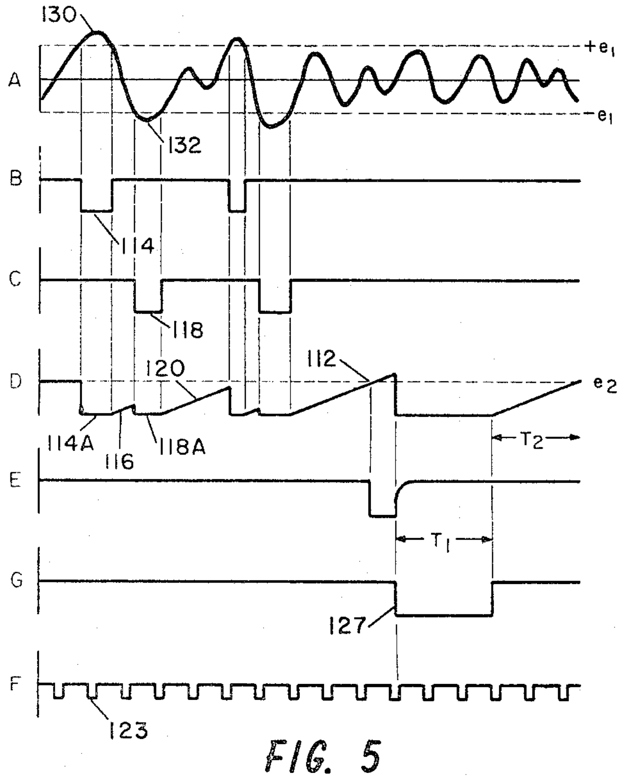
FIG. 5 illustrates waveforms useful in explaining the operation of the apparatus of FIG. 4.

FIG. 4 illustrates one suitable diagram of control circuit 92 of FIG. 1. The amplifier output of the amplifying system (last stage amplifier 90) of FIG. 1 is connected to a first Schmitt trigger circuit 89 and to an inverter 87. The output of inverter 87 is connected to a second Schmitt trigger circuit 85. Schmitt trigger circuits 89 and 85 can be identical and are of a character to have an output when the input voltage fed thereto exceeds a predetermined level. For example, the amplifier output is illustrated as Curve A in FIG. 5. When the voltage exceeds $e_1$, Schmitt trigger circuit 89 has an output illustrated at Curve B which is a negative pulse having the duration of the time in which the Curve A exceeds the voltage $e_1$. The output of Schmitt trigger circuit 85 is illustrated in Curve C and as its input is inverted, it has an output during the time which Curve A exceeds the voltage $-e_1$.

The output from Schmitt trigger circuit 89 is fed through a diode 81 to a junction 79. Likewise, the output of Schmitt trigger circuit 85 is fed through diode 100 to junction 79. The signal from junction 79 is fed to a time control circuit 102 which includes a capacitor 104 in parallel with a resistor 106. The common sides of capacitor 104 and resistor 106 are grounded at 108. The other common sides of capacitor 104 and resistor 106 are connected to a third Schmitt trigger circuit 110. The signal at junction 79 which is fed to timing circuit 102 is illustrated as waveform D in FIG. 5. Waveform D is influenced up to point 112 primarily by the output of Schmitt trigger circuits 89 and 85 which are illustrated as waveforms B and C of FIG. 5 and by capacitor 104. When pulse 114 of Curve B comes in, it is reproduced in Curve D as pulse 114A. Just before the time of the pulse 118 of Curve C, capacitor 104 starts to discharge as illustrated at 116. Then when pulse 118 occurs in waveform C, the Curve D again goes to the same level of negative voltage of pulse 118 as indicated at 118A. At the end of the duration of pulse 118, capacitor 104 beings to discharge as seen by the upward slope at 120. It will be noted that each slope in waveform D is essentially the same as capacitor 104 discharges at a rather uniform exponential rate.

The output of time constant circuit 102, which is represented by waveform D, is fed to Schmitt trigger circuit 110 which has an output when the voltage of waveform D exceeds a given voltage $e_2$. The voltages $+e_1$ and $-e_1$ represent selected amplitudes which it is desired for the "peaks" such as 130 and "valleys" such as 132 should reach. The output of Schmitt trigger circuit 110 is illustrated in Curve E of FIG. 5 and is connected to flip-flop 94A of the binary counter 93. The output E of Schmitt trigger circuit 110 is fed to one of the two inputs of "and" gate 122. The other input to "and" gate 122 is a clock pulse 123. The clock pulse can be from any convenient clock source 124. The output of clock 124 is illustrated as waveform F. Upon the simultaneous arrival at "and" gate 122 of a clock pulse and a pulse from Schmitt trigger circuit 110, one shot multivibrator 126 is triggered to put out a pulse of a given width as shown in waveform G of FIG. 5. The pulse 127 of waveform G is set for a selected duration $T_1$, such as for example, 50 milliseconds. The relatively long delay of pulse 127 in waveform G is fed through diode 83 to junction 79 and influences Curve D in a negative direction to maintain Curve D for time $T_1$ and pulse 127 of waveform G below the voltage level $e_2$ which fires Schmitt trigger circuit 110. This is to prevent Schmitt trigger circuit 110 from firing from two or more successive clock pulses. In other words, it prevents Schmitt trigger circuit 110 from having an output pulse at a shorter time interval than desired. For example, the time between firings of Schmitt circuit 110 is the duration of the time $T_1$ of the pulse 127 of waveform G and the time $T_2$ for the exponential slope of the discharge capacitor 104 to rise to $e_2$.

Figure 6:
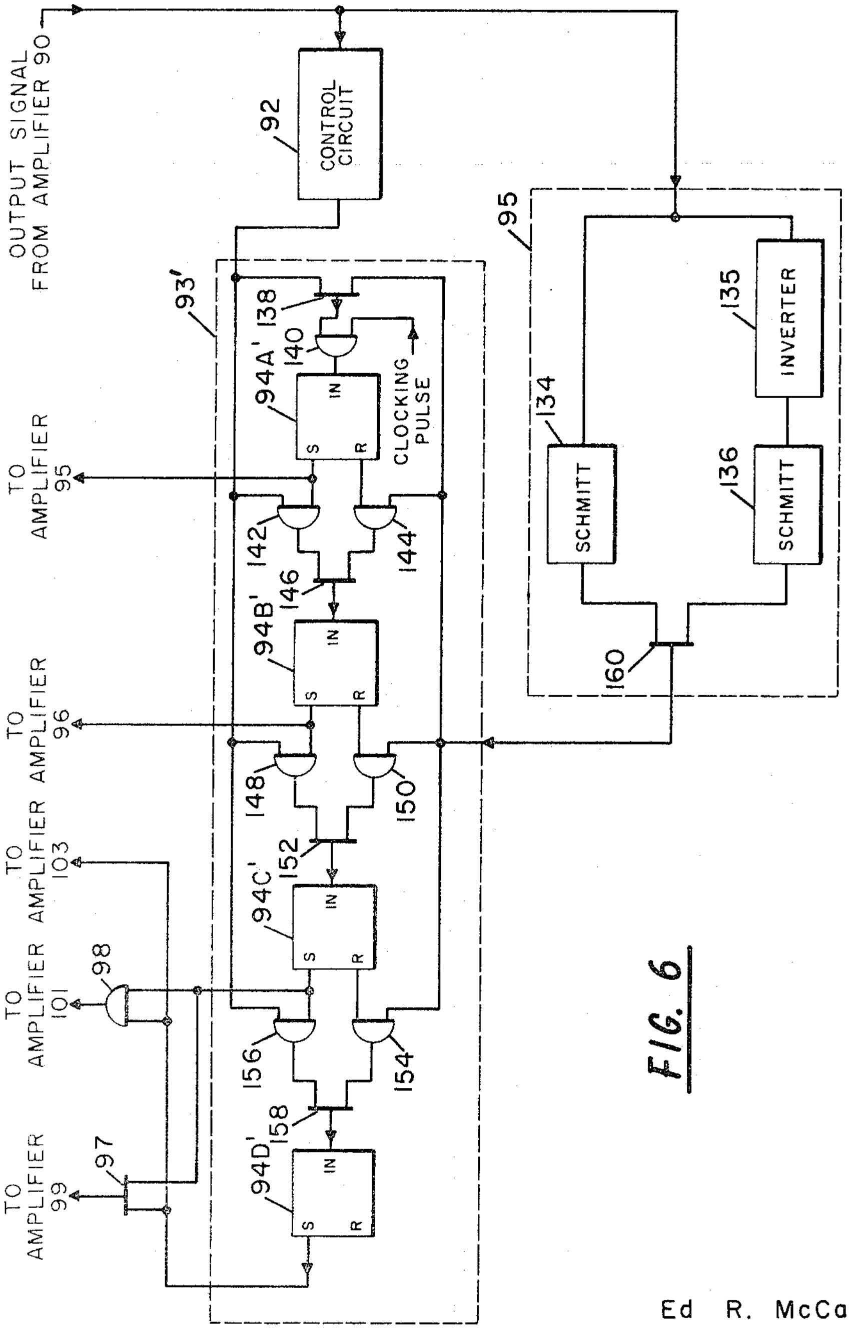
FIG. 6 illustrates a modification of the embodiment shown in FIG. 1 such that if the output signal increases beyond a selected amplitude level, the amplification is decreased.

FIG. 1 shows an embodiment whereby, as a signal grows weaker, the amplification is progressively increased stepwise by fixed amounts. FIG. 6 is a modification of that embodiment whereby, when the output signal from amplifier 90 grows stronger the overall effective amplification is decreased and, if the output signal from amplifier 90 decreases, the amplification increases. The output from amplifier 90, in addition to bring connected to control circuit 92, which can be called a "count-up" control circuit, is also connected to a second control circuit 95 which can be called a "count-down" or decreasing amplification control circuit. Whereas, control circuit 92 has an output pulse upon the output signal from amplifier 90 decreasing to a selected level, control circuit 95 has an output pulse when the output signal increases to a selected level.

The system of FIG. 6 contains a binary counter 93' having four flip-flops. They are flip-flops 94A', 94B', 94C', and 94D'. The output of control circuit 92 is connected to "or" gate 138, "and" gate 142, "and" gate 148, and "and" gate 156. The output of control circuit 95 is connected to one of the two inputs of "or" gate 138 to one of the inputs of "and" gates 144, 150, and 154. "And" gates 142, 144, 148, 150, 154, and 156, each has two inputs or "input legs," each of which must have an input thereon in order for the "and" gate to have an output. "And" gates 142, 148, and 156 have one of their input legs connected respectively to the set output of flip-flops 94A', 94B', and 94C'. "And" gates 144, 150, and 154 have one of their input legs connected to the reset output of "and" gates 94A', 94B', and 94C', respectively.

The output of "or" gate 138 is connected to one of the two input legs of "and" gate 140. The other input leg to "and" gate 140 is the clock pulse from the recording equipment, such as clock 124 of FIG. 4. The output of "and" gate 140 is connected to the input of flip-flop 94A'. By an "or" gate, it is meant that if either of the input legs have an input thereon, there is an output from the "or" gate.

The outputs of "and" gates 142 and 144 are connected to an "or" gate 146. The output of this "or" gate is connected to the input of flip-flop 94B'. The outputs of "and" gates 148 and 150 are connected to one input respectively of "or" gate 152 whose output is connected to the input of flip-flop 94C'. The outputs of "and" gates 154 and 156 are connected respectively to one of the inputs of "or" gate 158, whose output is connected to the input to flip-flop 94D'.

The set outputs of flip-flops 94A' to 94D' are also connected to the other part of the circuit of FIG. 1, similarly as shown in FIG. 1. For example, the set outputs of flip-flops 94A' and 94B' are connected to amplifiers 95 and 96, respectively. The set output of flip-flop 94C' is connected to one of the inputs of "or" gates 97 and to one of the inputs of "and" gate 98. The set output of flip-flop 94D' is connected to one of the "or" gates of amplifier 97, to the input of amplifier 103 and to one of the inputs of "and" gate 98. The output of "and" gate 98 is connected to amplifier 101 and the output of "or" gate 97 is connected to amplifier 99. The outputs of amplifiers 95, 101, 96, 103, and 99 are connected as shown in FIG. 1.

Attention will now be directed toward control circuit 95 which has an output if the output signal from amplifier 90 increases to a predetermined level. Control circuit 95 includes a first Schmitt trigger circuit 134 and a second Schmitt trigger circuit 136 connected in parallel. Connected in series with the Schmitt trigger circuit 136 is an inverter 135. The outputs of Schmitt trigger circuits 134 and 136 are connected to "or" gate 160 which has two input legs. This "or" gate can be similar to "or" gates 138, 146, and 152. That is, a signal on either of its input legs causes it to have an output.

Figure 8:
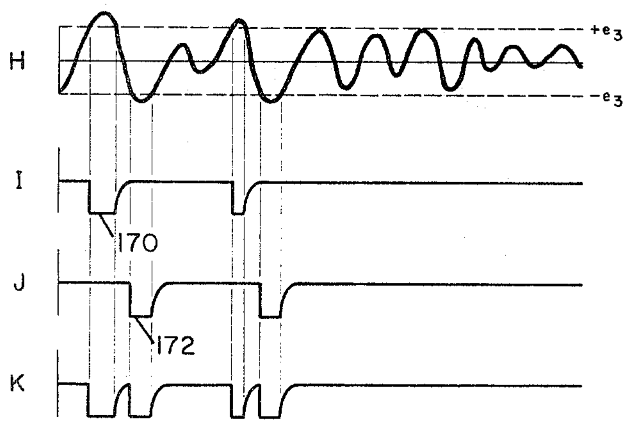
FIG. 8 illustrates waveforms useful in explaining the operations of the apparatus of FIG. 6.

As shown in FIG. 8, Schmitt circuit 134 has an output pulse when the signal H of FIG. 8 exceeds a given voltage $e_3$. The output of Schmitt trigger circuit 134 is a pulse similar to 170. As will be explained, the trailing edge of the pulse from both the Schmitt triggers 134 and 136 is slow enough so that it will not trip the following flip-flop. The signal fed to Schmitt trigger circuit 136 is inverted by inverter 135. This Schmitt trigger circuit 136 has an output if the voltage exceeds $-e_3$. The output is a pulse 172 for example, as shown in J in FIG. 8.

Figure 7:
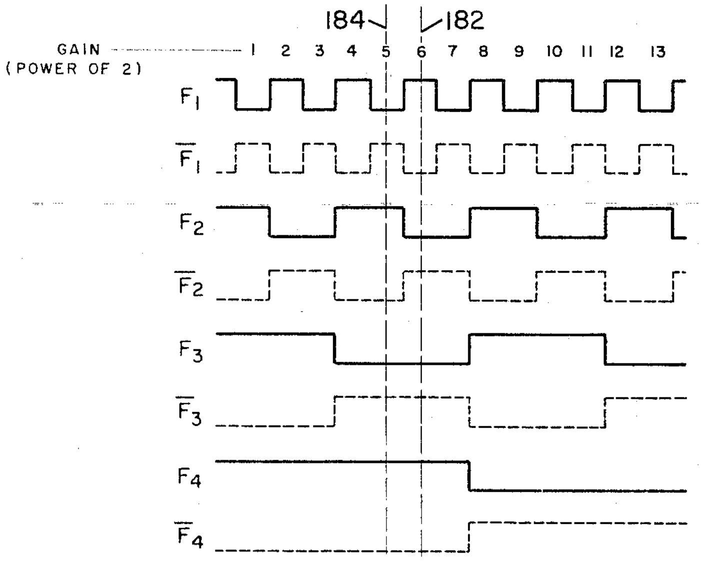
FIG. 7 illustrates the occurrence of set and reset outputs at the flip-flops of FIG. 6.

The modification of the circuit in FIG. 6 permits the gain to increase or decrease in accordance with the output signal from amplifier 90. As an example, if a circuit has increased its gain until it has a gain of 64 or $2^6$, the set and reset outputs of the various flip-flops 94A' to 94D' have outputs as illustrated in FIG. 7 at dotted vertical line 182. FIG. 7 illustrates the set output of flip-flops 94A to 94D, respectively, for different stages of amplification. The stage of amplification is indicated by the numerals at the top illustrating the power of 2 representing the gain. $F_1$, $F_2$, $F_3$, and $F_4$, illustrate the set output and $\overline{F}_1$, $\overline{F}_2$, $\overline{F}_3$, and $\overline{F}_4$, the reset output of flip-flops 94A', 94B', 94C', and 94D' respectively.

For an example as to how the circuit operates let it be assumed that the effective total amplification has increased until it is in the stage where it has an amplification of $2^5$. The various flip-flops have the outputs as illustrated at dotted line 184 in FIG. 7.

Let it be assumed that the output signal continues to decrease so that the control circuit 92 has another output pulse. This output is fed to the "or" gate 138 and to "and" gates 142, 148, and 156. When the waveform E of FIG. 5, i.e. the output of control circuit 92, goes negative, i.e. has a pulse identified as the "example" pulse for purposes of identification and illustration, and in coincidence with a clocking pulse which is fed to "and" gate 140, flip-flop 94A', flips from the negative state on $F_1'$ to the positive state on $F_1'$ as shown in FIG. 7. This positive-going pulse is coupled through "and" gate 142 and coincident with pulse E triggers flip-flop 94B' and sets it from the positive state to the negative state since the set side of 94B' was positive prior to the "example" pulse. "And" gate 148 was disabled since it has one input leg positive and one input leg negative. Thus, flip-flop 94C' does not trip. "And" gate 156 will have both legs negative but since flip-flop 94C' does not trip, there will be no positive going edge to trip 94D' so 94D' will not trip because the trailing edge of waveform "E" is not sharp enough to trigger a flip-flop. Flip-flops are set in a state following the "example" pulse as indicated on the dotted line 182 in FIG. 7.

In order to prevent waveform E from control circuit 92 from tripping the flip-flops when the pulse goes from minus to plus, or at the end of the pulse duration, the trailing edge of the pulse is made very broad so that it does not have sufficient rise time to trigger the flip-flops. This is so the flip-flops are flipped from the preceding flip-flops and not from the end of the pulse of waveform E.

For example, let it now be assumed that the output signal of amplifier 90 increases to a selected level such that it is desired to switch the flip-flops in the opposite directions so as to decrease the gain. At this point, control circuit 95 has an output pulse or signal, identified here as a "decrease gain" signal.

When "or" gate 160 has an output (as illustrated in curve K of FIG. 8) this indicates that the output signal from amplifier 90 has increased to the point such that the amplification should be decreased. This pulse from "or" gate 160 is connected to one leg or input of "and" gates 144, 150, and 154 and also to the "or" gate 138 on flip-flop 94A'. The next clocking pulse that appears then trips flip-flop 94A' as the pulse from "or" gate 160 has enabled "and" gate 140. Flip-flop 94A' is then tripped from the positive state to the negative state or from the position indicated at line 182, FIG. 7, to the position indicated at line 184. The reset side of flip-flop 94A', or $\overline{F}_1'$ going from negative to positive is connected to "and" gate 144. The other input leg of "and" gate 144, also being negative prior to the pulse, will transmit a positive-going pulse at its output and will transmit it through "or" gate 146 to the input of flip-flop 94B'. This resets flip-flop 94B' to the opposite state. The reset side of flip-flop 94B' or $\overline{F}_2$ (FIG. 7) goes from positive to negative. However, this will not produce a trigger input as a pulse from negative to positive is required. Therefore, no trigger pulse is produced at the output of "and" gate 150 so flip-flop 94C' will not flip or change states at this time. Likewise, flip-flop 94D' will not flip, thus the flip-flops are set to the previous position which is illustrated in the interval designated by dotted line 184.

In order to prevent waveform K from "or" gate 160 from tripping the flip-flops when the pulse goes from minus to plus or, at the end of the pulse duration, the trailing edge of the pulse is made very broad so that it does not have sufficient rise time to trigger the flip-flops. Therefore, the trailing edge of waveform pulse of K is made slow enough so that it will not trip the flip-flops. This is so that the flip-flops are tripped from the preceding flip-flops and not from the end of a pulse of waveform K.

While there are disclosed but a limited number of embodiments of the system of the invention herein presented, it is possible to produce other embodiments without departing from the inventive concept herein disclosed. It is therefore desired that only such limitations be imposed on the appended claims as are stated therein.

What is claimed is:

1. A cascaded amplifying system for amplifying a seismic signal which comprises:

- a first, a second, a third, a fourth, a fifth, and a sixth amplifier means connected in cascade;
- a first losser circuit connected between said first and second amplifier means, a second losser circuit connected between said second and third amplifier means, a third losser circuit connected between said third and fourth amplifier means, a fourth losser circuit connected between said fourth and fifth amplifier means, and a fifth losser circuit connected between said fifth and sixth amplifier means; each said losser circuit including a bypass circuit having a normally open switch therein;
- control circuit means connected to the output of the last amplifier stage and having an output pulse upon the energy of the signal from the last said amplifier decreasing to a predetermined level;
- a binary counter having a first, a second, a third, and a fourth flip-flop and connected to the output of said control circuit means;
- first means operative to close the switch of the bypass of said fifth losser circuit (78) upon the first flip-flop having a true "set" output;
- second means operative to close the switch to the bypass of said third losser circuit (50) upon the second flip-flop having a true "set" output;
- third means operative to close the switch of the bypass of first losser circuit (18) upon either the third or fourth flip-flop having a true "set" output;
- fourth means operative to close the switch of the bypass of said second losser circuit (36) upon said fourth flip-flop having a true "set" output; and
- fifth means operative to close the switch of the bypass of said fourth losser circuit (64) upon said third flip-flop and said fourth flip-flop having simultaneous true "set" outputs.

2. An apparatus as defined in claim 1 in which each amplifier stage has an amplification factor of eight and said first losser circuit having an attenuation factor of 16, said second losser circuit having an attenuation factor of 16; said third losser circuit having an attenuation factor of 4; said fourth losser circuit having an attenuation factor of 16; and said fifth losser circuit having an attenuation factor of 2.

3. An apparatus as defined in claim 1 in which said first losser circuit includes:

- a first series resistor between said first amplifier means and said second amplifier means;
- first shunt means having a normally open switch shunting said first resistor;
- a circuit including a shunt resistor connecting the circuit between said first series resistor and said second amplifier means to ground, such circuit having a normally closed switch therein;
- gang means ganging the switch of said first shunt means and said normally closed switch, such that when one is closed the other is open, 4. An apparatus as defined in claim 3, including a filter means connected to the output of said first amplifier means, a ground resistor electrically connected between ground and the input to said second amplifier means, said first series resistor (20) and said shunt resistor (22) and said ground resistor (32) being selected to keep the output impedance of said filter constant.

5. An apparatus as defined in claim 4 in which said control circuit includes:

- a first Schmitt circuit (89);
- an inverter (87);
- a second Schmitt circuit (85) connected to the output of said inverter;
- means connecting said first Schmitt circuit and said inverter to the output of said sixth amplifier means;
- a first diode electrically connected to the output of said first Schmitt circuit;
- a second diode electrically connected to the output of said second Schmitt circuit;
- a third Schmitt circuit;
- a time constant circuit connected to the output of said first diode and said second diode, the output of said time constant circuit being electrically connected to the input to said third Schmitt trigger circuit;
- an "and" gate having two inputs, both of which must be true to have an output;
- a clock system connected to one of the inputs of said "and" gate;

means connecting the output of said third Schmitt circuit to the second input to said "and" gate;
a one shot multivibrator electrically connected to the output of said "and" gate;
a diode connected to the output of said one shot multivibrator;
means connecting the output of said third diode to the input of said time constant circuit.

6. An apparatus as defined in claim 1 including:
a second control circuit means connected to the output of the last amplifier stage and having an output pulse upon the energy of the signal from the last said amplifier increasing to a predetermined level;
a first "and" gate having two input legs and an output, said output connected to the input of said first flip-flop;
a second "and" gate having two input legs and an output;
a third "and" gate having two input legs and an output;
a fourth "and" gate having two input legs and an output leg;
a fifth "and" gate having two input legs and an output;
a sixth "and" gate having two input legs and an output;
a seventh "and" gate having two input legs and an output;
a first "or" gate having two input legs and an output, the output being connected to one of the input legs of said first "and" gate;
a second "or" gate having two input legs and an output, the output of said "or" gate being connected to the input of said second flip-flop, one of the input legs being connected to the output of said second "and" gate and the other leg connected to the output of said third "and" gate;
a third "or" gate having two inputs and an output, one of said inputs being connected to the output of said fifth "and" gate and the other to the output of said fourth "and" gate, the output of said third "or" gate being connected to the input of said third flip-flop;
a fourth "or" gate having two input legs and an output, the output being connected to the input of said fourth flip-flop, one of the input legs being connected to the output of said sixth "and" gate and the other input leg being connected to the output of said seventh "and" gate;
means connecting the output of said control circuit means to one of the inputs of said first "or" gate, to one of the inputs of each of said third, fifth, and seventh "and" gates;
connecting means connecting the output of said second control means to one of the inputs of said first "or" gate and to one of the inputs of each of said second, fourth, and sixth "and" gates;
circuit means connecting one of the inputs to said second, fourth, and sixth "and" gates respectively to reset output of said first, second, and third flip-flops;
connecting means connecting the "set" output of said first, second, and third flip-flops to one of the input legs respectively of said third, fifth, and seventh "and" gates; and
a clocking pulse source connected to one of the inputs of said first "and" gate.

7. An apparatus as defined in claim 6 in which the attenuation and the amplification are factors of powers of two.

8. An apparatus which comprises:
a first amplifier stage means;
a second amplifier stage means;
attenuation means electrically connected between said first and said second amplifier stage means;
the total gain of said amplifier stage means being equal to $2^n$ and the attenuation of said attenuation means being a factor of $2^n$ where $n$ is a whole number;
short circuiting means bypassing said attenuation means;
a normally open switch in said short circuiting means;
means responsive to the output of said second amplifier stage means operative to close said switch means when the energy content of said output declines to a preselected level.

9. Apparatus for controlling the amplitude of an electrical signal which progressively decreases in amplitude with respect to time comprising:
an input circuit;
an output circuit;
signal amplitude varying means connecting said input circuit to said output circuit to provide an electrical signal channel therebetween;
control means connected to said amplitude varying means to progressively increase the amplification thereof responsive to successive electrical pulses received thereby, said control means being operative to increase the amplification of said amplitude varying means by discrete steps proportional to a given power of two responsive to each pulse received thereby; and
means connected to said output circuit and to said control circuit means for feeding time-spaced electrical pulses to said control circuit means when the amplitude of an electrical signal of said output circuit is less than a predetermined magnitude.

10. Apparatus for controlling the amplitude of an electrical signal which varies in amplitude with respect to time comprising:
an input circuit;
an output circuit;
signal amplitude varying means connecting said input circuit to said output circuit to provide an electrical signal channel therebetween;
control means having a first input and a second input and connected to said amplitude varying means to increase the amplification thereof by discrete steps proportional to two to a given power responsive to successive electric pulses received on said first input and to decrease the amplification responsive to successive electrical pulses received on the second input;
first means connected to said output circuit and to said first input of said control means for pulsing said control means when the amplitude of an electrical signal in said output circuit is less than a predetermined magnitude; and
second means connected to said output circuit and to the second input to said control means for pulsing said control means when the amplitude of an electrical signal in said output circuit is more than a predetermined magnitude.

11. Apparatus for controlling the amplitude of an electrical signal which varies in amplitude with respect to time which comprises:
a first amplifier stage means;
a second amplifier stage means;
attenuation means electrically connected between said first and said second amplifier stage means;
the total gain of said amplifier stage means being equal to two to a given power and the attenuation of said attenuation means being equal to two to a second given power;
short circuiting means bypassing said attenuation means;
a switch in said short circuiting means;
first control means responsive to the output of said second amplifier stage means operative to close said switch means when the energy content of the output of said second amplifier stage declines to a preselected level; and
second control means responsive to the output of said second amplifier stage means operative to open said switch means when the energy content of such output increases to a preselected level.

12. An apparatus as defined in claim 11 in which the total gain of said amplifier stage means is two to a given power, and the attenuation of said attenuation means is two to a second given power.

References Cited by the Examiner

UNITED STATES PATENTS

| | | | |
|---|---|---|---|
| 1,565,555 | 12/1925 | Fetter | 330—144 |
| 2,228,866 | 1/1941 | Bjornson | 330—145 X |
| 2,346,020 | 4/1944 | Gillespie | 330—133 |
| 3,133,278 | 5/1964 | Millis. | |
| 3,222,609 | 12/1965 | Ulmer et al. | 330—145 |
| 3,241,100 | 3/1966 | Loofbourrow | 340—15.5 |

ROY LAKE, *Primary Examiner.*

J. B. MULLINS, *Assistant Examiner.*